Patented Nov. 30, 1943

2,335,603

UNITED STATES PATENT OFFICE 2,335,603

ART OF PREPARING DERIVATIVES OF ANACARDIC MATERIAL

Emil E. Novotny, Oak Lane, and George Karl Vogelsang, Frankford, Pa., assignors to Durite Plastics, Incorporated, Philadelphia, Pa., a corporation of Pennsylvania No Drawing. Application April 29, 1938,
Serial No. 204,998

2 Claims. (Cl. 260—619)

This invention relates to the art of preparing derivatives of anacardic material, and concerns itself more particularly with the preparation of a distinctively new and very useful class of non-resinous substances obtained by heating anacardic material with one or more phenols under suitably controlled reaction conditions.

Anacardic material suitable for the purposes of the present invention is represented by the shell liquid of the cashew nut (Anacardium occidentale) as such or heat treated in the manner to be hereinafter described, and the various derivatives of the shell liquid such as the reaction products of the shell liquid with alcohols disclosed in our Patent No. 2,251,547, issued August 5, 1941, the irreversible reaction products of the shell liquid with amines disclosed in our Patent No. 2,253,088, issued August 19, 1941, and the chlorination products of the shell liquid disclosed in our copending application, Serial No. 188,796, filed February 4, 1938. Briefly stated, the chlorination products of cashew nut shell liquid are prepared by subjecting the shell liquid to the action of a chlorinating agent such as gaseous or liquid chlorine. The term "anacardic material" will be used in the following description and claims to include any of the aforementioned materials, unless otherwise indicated or required by the context.

By the term "phenol" we intend to include all suitable non-resinous substances having at least one reactive hydroxyl group attached directly to an aromatic ring. The phenol may be a monohydric phenol such as carbolic acid, the cresols, cresylic acid and the xylenols; a dihydric phenol such as catechol and resorcinol; a trihydric phenol such as pyrogallol and phloroglucinol; or a substituted phenol containing an element or grouping such as a halogen, an amine group, a nitro group or a carboxyl group directly attached to the aromatic ring in addition to one or more reactive hydroxyl groups. As additional examples of suitable phenols may be mentioned the corresponding phenolic derivatives of diphenyl, naphthalene, anthracene and phenanthrene. It is to be particularly noted that the term "phenol" is not intended to include resinous substances containing one or more reactive phenolic hydroxyl groups. Such resinous substances may be reacted with anacardic materials and their derivatives including the phenol derivatives of the present invention to form a distinctive class of synthetic resins having unique properties. In this connection, reference is hereby made to application Serial No. 158,701, filed August 12, 1937, by E. E. Novotny, wherein is disclosed the preparation of synthetic resins of this class by reacting a resinous substance containing one or more reactive phenolic hydroxyl groups with either cashew nut shell liquid or anacardic acid.

In its very essence, the method of the present invention consists in heating anacardic material under suitably controlled reaction conditions with one or more phenols.

It can readily be demonstrated that the method of the invention produces definite stable derivatives of anacardic material containing a phenolic grouping; in other words that the process serves to phenolate anacardic material. If ordinary cashew nut shell liquid is heated to approximately 500° F., a loss in weight of over 10% occurs. The material that distils off consists primarily of carbon dioxide and water. The same result is produced, if the cashew nut shell liquid is first mixed with an inert high boiling solvent such as xylol and then heated to about 500° F. If, however, the cashew nut shell liquid is mixed with a phenol and a catalyst, and then heated to approximately 500° F., the reaction product after the excess phenol, etc., is driven off weighs more than the original shell liquid. Calculation reveals the fact that the increase in weight is roughly equivalent to one molecule of phenol per molecule of anacardic material. In the case of the readily-distillable phenols such as carbolic acid, a part of the phenol can be driven off by high vacuum distillation at elevated temperatures, which appears to indicate that a part of the phenol is either free or very loosely combined. In the case of the difficultly-distillable phenols, all of the phenol appears to be firmly combined with the anacardic material.

As has been indicated, a catalyst may be employed to facilitate the process. However, a catalyst is not absolutely essential. Generally speaking, it may be stated that substances of an acidic nature or substances which are capable of liberating acidic materials are suitable as catalysts. As examples of suitable catalysts may be mentioned inorganic acids such as sulphurous, sulphuric, hydrochloric and phosphoric acid, and the alkyl derivatives of sulphuric acid such as diethyl sulphate as well as phenolic acids such as phenol sulphonic acid.

The reaction may very advantageously be carried out in a vessel provided with suitable means for heating and agitating the contents thereof as well as with a reflux condenser and a vapor pipe. The heating facilities should be such as to permit the attainment of temperatures as high as 500° or 600° F. The capacity of the vessel should be such as to allow sufficient space to take care of foaming during the phenolation. However, it is to be noted that the tendency of the reaction mixture to foam may be greatly reduced by pretreating the anacardic material to remove water and volatile materials.

The pretreatment may consist in heating the anacardic material either alone or in admixture with a small quantity of an amine such as aniline or toluidine. The amine may be added in an amount equal to one-half or one per cent on the weight of the anacardic material. Suitable proportions are one ounce of aniline to five pounds of cashew nut shell liquid. The mixture may be heated slowly to about 500° F. and kept at that temperature for about five to fifteen minutes. As has been stated, the removal of the volatile material and water from the anacardic material greatly decreases its tendency to foam during the phenolation. The pretreatment also appears to minimize polymerization or condensation of the anacardic material and renders it possible to obtain a greater degree of uniformity in the phenolation product.

The proportions of the reagents and the specific details of procedure depend to a large extent upon whether the phenol used in the process is readily or difficultly distillable. In the case of readily-distillable phenols, the phenol should preferably be employed in excess of molecular proportions to the anacardic material. In the case of difficultly-distillable phenols, the phenol and anacardic material should preferably be present in equi-molecular proportions.

The following is an illustrative procedure for phenolating anacardic material with a phenol which is of a readily-distillable nature:

Anacardic material such as pretreated cashew nut shell liquid is mixed with carbolic acid in the ratio of 24 parts of shell liquid to 12 parts of phenol. The phenol may preferably contain dissolved therein about 0.65 part of concentrated sulphuric acid. The mixture is heated and constantly stirred until the temperature reaches the boiling point of the mixture. The mixture is then refluxed for about forty-five minutes, after which it is slowly distilled for about three hours, the temperature finally reaching 500° F. The excess phenol is driven off during the distillation, and the phenolated anacardic material which is left is a viscous liquid slightly heavier than so-called heavy molasses. The yield of phenolated anacardic material amounts to between 28 and 29 parts.

If untreated cashew nut shell liquid is employed instead of the pretreated shell liquid, the shell liquid may first be added to the reaction vessel with a small amount of an amine and heated to about 500° F. in the manner previously stated, after which the phenol and catalyst may be added and the phenolation carried out as in the illustrative procedure.

The foregoing procedures may be readily adapted for the phenolation of anacardic material with phenols whose boiling points exceed 450° or 500° F. As examples of such phenols may be mentioned the crude high boiling cresylic acids. The anacardic material and the phenol are mixed in equi-molecular proportions, though a slight excess of phenol is not precluded. An acid catalyst such as sulphuric acid in an amount equal to from 0.5 to 3.0% on the weight of the anacardic material may be added to the mixture, or it may have previously been dissolved in the phenol. Too large an amount of catalyst should be avoided, as it tends to cause an undue condensation-polymerization of the anacardic material. The mixture is heated until boiling sets in, and is then refluxed for about thirty minutes. The mixture is then fractionally distilled to drive off the water, part of which was formed in the reaction. The temperature is then raised to between 400° and 450° F., and the mixture again refluxed for several hours. The temperature is then increased to 500° F. and the mixture again distilled to get rid of the last traces of water. The end products are viscous liquids, which are usually somewhat heavier than so-called heavy molasses, and contain at the most only a small quantity of free phenols.

The phenolated anacardic materials of this invention are characterized by exceptional chemical activity, compatibility and physical properties, which render them eminently suitable for a large number of industrial applications. As an indication of their wide field of usefulness, it may be stated that generally speaking they may be employed for many of the purposes for which anacardic materials have been either used or suggested. They may be used as raw materials for the manufacture of printing inks, varnishes, lacquers, impregnating agents, synthetic resins and molding compositions. They are particularly well suited for incorporation with natural and synthetic gums, resins, rubbers, latices, etc. They impart to the materials with which they have been incorporated exceptional plasticity, toughness, shock resistance, etc. They have the advantage over many of the materials formerly used for this purpose in that they may be readily resinified in situ, ending up in the final product as resins which are wholly compatible with the materials with which they have been incorporated. The phenolated materials have a decided advantage over the unphenolated anacardic materials in that they do not have as great a tendency to produce dermatitis as do the naturally occurring anacardic materials and certain of their derivatives. Other advantages over the naturally occurring anacardic materials will be hereinafter pointed out.

The phenolated anacardic materials readily lend themselves to chlorination in the manner disclosed in our copending application Serial No. 188,786, filed February 4, 1938. They may also be mixed in various proportions with chlorinated anacardic materials to modify their properties and to render them more suitable for particular purposes.

The phenolated anacardic materials can be resinified in much the same way and with the same reagents as can cashew nut shell liquid and anacardic acid but to much better advantage and with better results. The reagents with which the phenolated materials may be reacted to form resins may be either resinous or non-resinous. As examples of non-resinous reagents may be mentioned aldehydes such as formaldehyde, furfural, benzaldehyde, acetaldehyde, salicylaldehyde, anisaldehyde, etc., ketones such as acetone and its homologues, phenol alcohols such as saligenin, and drying and non-drying oils such as linseed oil, tung oil, rape seed oil, cotton seed oil, etc.

Phenolated anacardic material when treated with about five to ten per cent of a hardening agent such as paraformaldehyde produces a tough leathery product. This product may be finely ground and incorporated as a filler in brake linings. When used for this purpose, the product imparts to the brake linings a greatly increased coefficient of friction and exceptional wearing quality.

When phenolated anacardic material is caused to react with hexamethylenetetramine or with its addition products such as mono-hexa-oxalate, mono-hexa-phthalate or with mixtures of two or more of said materials, more or less elastic, plastic masses are produced, which may with great advantage be incorporated into compositions containing synthetic or natural rubbers, resins or gums, particularly when it is desired to increase their stiffness.

As examples of resinous substances with which phenolated anacardic materials may be reacted may be mentioned condensation products of phenols with aldehydes, carbohydrates, ketones, etc., resins of the "glyptal" type, resins of the ketone-aldehyde type including the ketone-aldehyde resinous complexes disclosed in our copending application, Serial No. 182,010, filed December 27, 1937, resins of the coumarone and indene type, resins of the "Styrol" type and ester gums, as well as the natural resins such as rosin, dragon's blood, copal, manila gum, fossil gum and gum accroides. The phenolated anacardic materials may be reacted with mixtures of two or more of the foregoing resins, or may be reacted first with one of the listed resins and then with another resin, depending upon the specific result which is desired.

The following is given as an example of a method for preparing a fusible, grindably hard synthetic resin from phenolated anacardic material:

Phenolated anacardic material such as phenolated cashew nut shell liquid is mixed with a phenol-aldehyde resin of the permanently fusible type such as "Durite No. 291" in the ratio of 270 parts of the phenolated material to 330 parts of the resin. "Durite No. 291" is a product of Durite Plastics, Inc., of Philadelphia, Pennsylvania, and is made by reacting phenol with insufficient formaldehyde to completely resinify the phenol. The mixture is slowly heated to 550° F. with continuous stirring, and then held at that temperature until a sample withdrawn from the reaction vessel and cooled is homogeneous and grindably hard.

It is important to note that in the foregoing method, a much smaller proportion of phenol-aldehyde resin is necessary than if unphenolated anacardic material were employed. Furthermore, that the reaction proceeds with greater speed, much more smoothly and without excessive foaming, and that grindably hard products are obtained much more easily than in the case of the unphenolated material. It is also to be noted that the product is definitely superior in several important respects. For instance, the product is characterized by better stability, flow under heat, plasticity, rolling properties, moldability, rate of cure, flexibility, strength, etc., than the corresponding resinous materials produced from cashew nut shell liquid or anacardic acid. It follows, therefore that the product has a wider range of usefulness than many of the synthetic resins made by prior art methods. The product is suitable for either hot or cold molding and is very well adapted for casting processes and extrusion molding. Various materials such as fillers, plasticizers and other modifying ingredients may be incorporated. As specific examples of suitable materials may be mentioned natural and synthetic resins such as copal, rosin, fossil gum, shellac, kauri, coumarone and phenol-aldehyde resins, waxes, pitches, drying oils such as linseed oil, tung oil, rape seed oil, castor oil, cotton seed oil, and fish oil, and fillers such as ground slate, zinc oxide, wood flour, soya bean meal, barytes, iron oxide, asbestos and silica. An important advantage as far as the use of fillers and modifying agents is concerned is that greater amounts of these relatively inexpensive materials may be used than in the case of previously prepared resins from anacardic acid or cashew nut shell liquid.

The following is given as another example of a method for preparing a grindably hard, fusible synthetic resin from phenolated anacardic material:

Phenolated anacardic material such as phenolated cashew nut shell liquid (100 parts) is mixed with 67 parts of gum accroides and heated with constant stirring to 550° F. The mass is kept at this temperature for about fifteen minutes, and to the molten mass is added gum accroides (33 parts), a phenol-aldehyde resin such as "Durite No. 291" (33 parts) and a phenol-furfural resin such as "Durite No. 220X" (33 parts). Durite 220X may be made as described in Patent No. 1,705,493, issued March 19, 1929, to E. E. Novotny and D. S. Kendall. The temperature is brought back to 550° F. and maintained at this point until a sample withdrawn from the reaction vessel and cooled is homogeneous and grindably hard.

It is to be noted that in the foregoing example, less of the phenol-aldehyde resin is employed. This is of considerable importance as the phenol-aldehyde resin is the most expensive ingredient. In this connection, it may be stated that it is possible by rearranging the proportions somewhat to dispense with all of the "Durite No. 291." The following is given as an illustrative example, wherein a grindably hard, fusible resin is obtained with only relatively inexpensive ingredients:

Phenolated anarcardic material such as phenolated cashew nut shell liquid (284 parts) is heated with 158 parts of gum accroides to about 550° F. as in the previous example. After about fifteen minutes, 158 parts of a phenol-furfural resin such as "Durite No. 220X" is added together with 6 parts of alpha-naphthylamine. The temperature is gradually brought up to 500° F. and the heating discontinued. When a withdrawn sample on cooling appears to be homogeneous and grindably hard, the reaction mixture may be poured out into cooling trays.

The naphthylamine acts as a stabilizing agent and serves to prevent the product from being converted by the high temperature to the final infusible state.

It should be noted that in each of the foregoing illustrative methods, substantially the same advantages are obtained as compared with the use of the unphenolated anacardic materials. The second and third methods have the additional advantage that still less expensive materials are employed than even in the first method. What has been said in reference to the resinous reaction products of phenolated anacardic materials with phenol-aldehyde resins and gum accroides applies generally to resinous reaction products with other reagents.

It follows from what has been said that the phenolated anacardic materials and their resinous derivatives lend themselves very readily for the preparation of many articles which have formerly been made in whole or in part of other materials. The following products are mentioned by way of example: electrical insulation, tool handles, knobs, containers, serving trays, printing plates, phonograph records, noiseless gears, flooring materials, typewriter ribbons, stencil sheets, abrasive wheels, brake linings and clutch facings.

In the production of abrasive articles, the phenolated anacardic materials may be used as such to coat the abrasive grain for the purpose of promoting the adhesiveness of the pulverized resin bond thereto. They may also be used in the form of a liquid or dissolved synthetic resin to bond the grain, as well as in the form of a grindably hard resin as the grain itself. In whatever form used, the phenolated materials end up in the final product as resins.

The foregoing specification and description include the essential and distinctive thought of our invention, but it is to be understood that the present disclosure is intended to be illustrative rather than restrictive, and that no limitations are to be imported which are not required by the language of the appended claims and the state of the prior art. It is to be further understood that the invention is not dependent upon any explanations or theories which have been set forth as descriptive of the reactions involved, nor dependent upon the soundness or accuracy of any theoretical statements so advanced.

We claim:

1. As a composition of matter, the non-resinous reaction product of a non-resinous phenol and one or more anacardic materials selected from the group consisting of the shell liquid of the cashew nut, the reaction products of said shell liquid with alcohols, the irreversible reaction products of said shell liquid, with amines, and the chlorination products of said shell liquid, the phenol and the anacardic material being combined in substantially equi-molecular proportions.

2. The method of making a non-resinous phenol derivative of an anacardic material selected from the group consisting of the shell liquid of the cashew nut, the reaction products of said shell liquid with alcohols, the irreversible reaction products of said shell liquid with amines, and the chlorination products of said shell liquid, which consists in heating a mixture of said anacardic material and a non-resinous phenol corresponding to the desired phenol derivative in the proportions of substantially one mole of phenol to each mole of anacardic material to a point short of resinification.

EMIL E. NOVOTNY.
GEORGE KARL VOGELSANG.